United States Patent Office 3,356,388
Patented Dec. 5, 1967

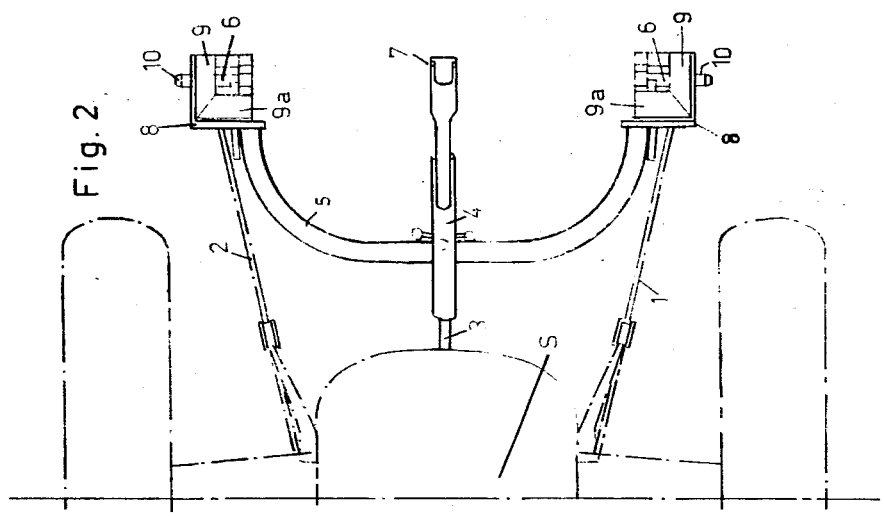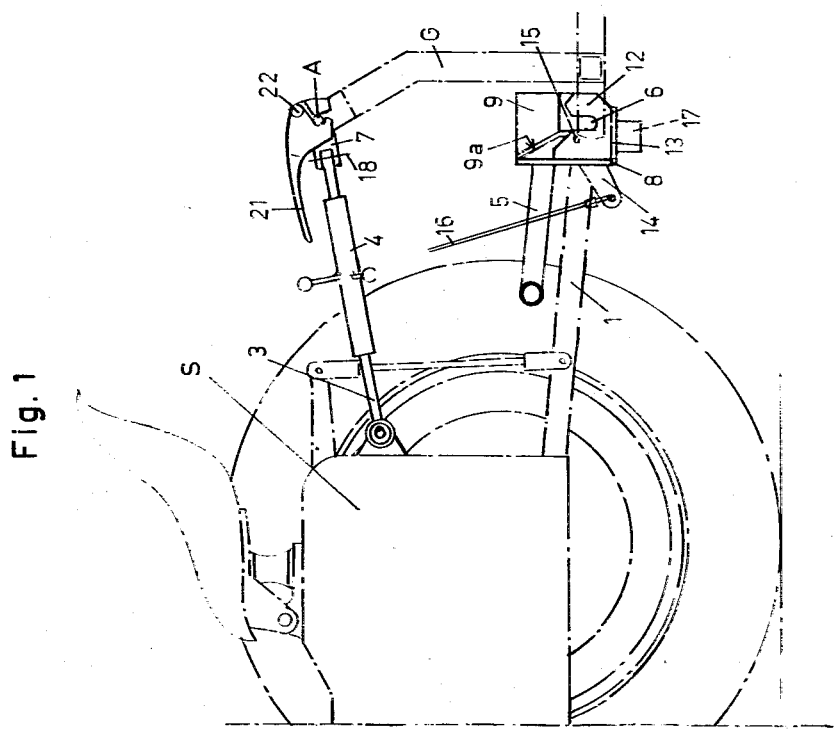

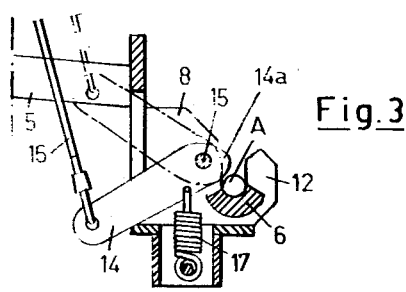
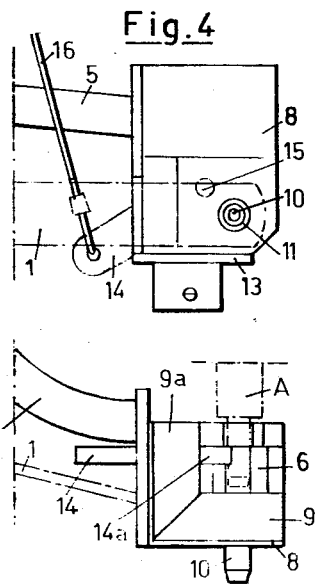
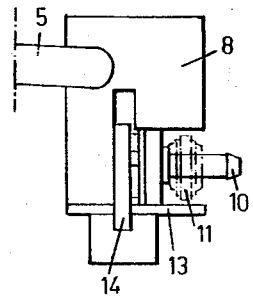

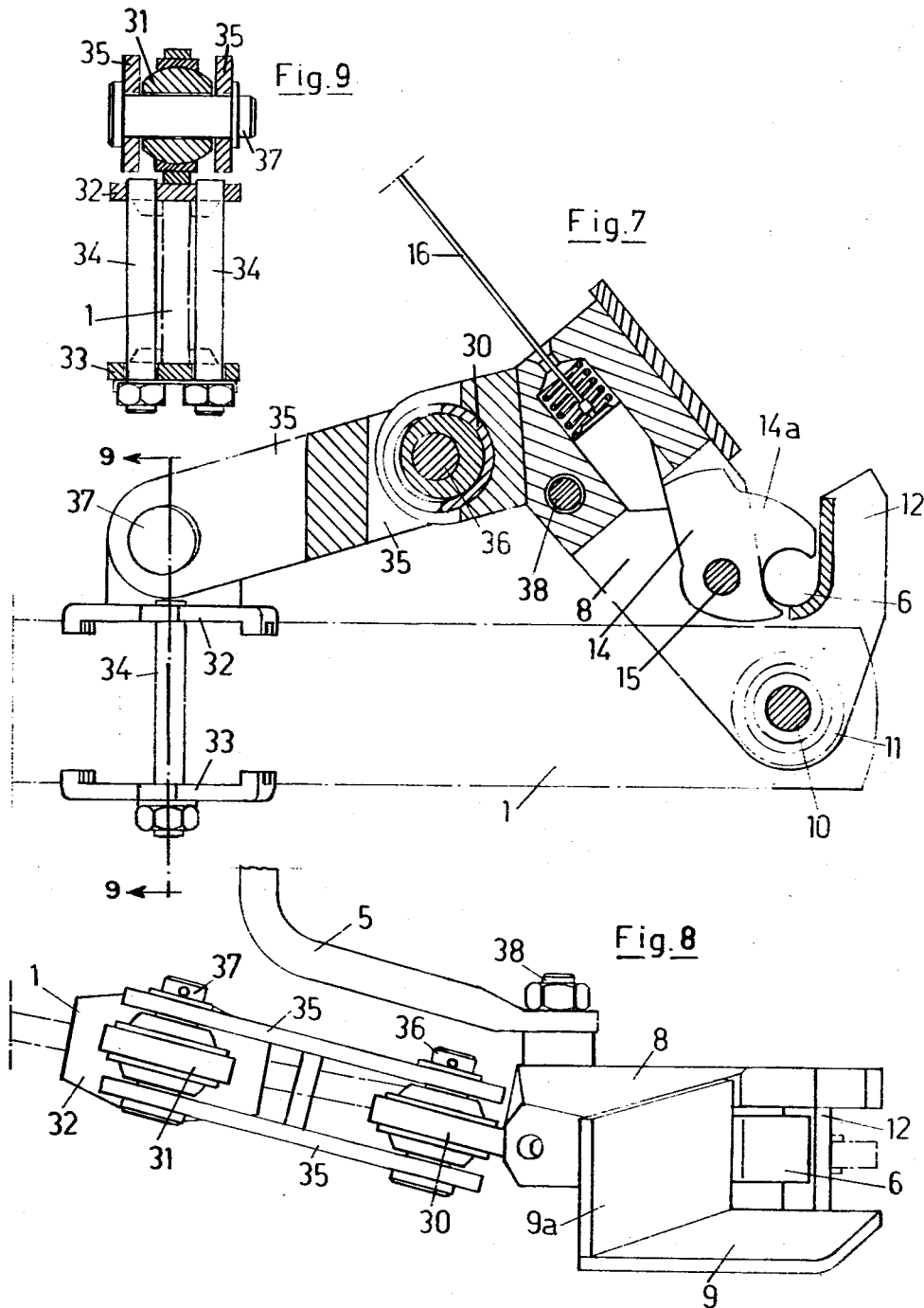

3,356,388
SELF-COUPLING TRACTOR-TRAILER HITCH
Hans Prillinger, Wels-Wimpassing 19, Austria, and Karl
Wanitschka, Heimstattenring 6, Wels, Austria
Filed May 6, 1965, Ser. No. 453,765
6 Claims. (Cl. 280—479)

The present invention relates to a self-coupling tractor-trailer hitch, and more particularly to a tractor-trailer hitch for use with agricultural tractors, and for attachment thereto of harvesting or other agricultural machinery or load carrying trailers.

Many tractors have projecting attachment arms, usually hydraulically movable, and designed to have attached thereto either agricultural machinery, or trailers. These arms are fitted at their ends with holes or bearings designed to cooperate with pintles or pins secured to the trailer or equipment designed to be pulled by the tractor.

It is an object of the present invention to provide a self-coupling trailer hitch which is so arranged that exact alignment of the coupling pins provided on the trailer, with the tractor, is not necessary at the time that the tractor and trailer are to be attached, so that the tractor can be driven, that is backed up against the trailer, and the pins will engage into the hitch of the tractor.

It is a further object of the present invention to provide a tractor-trailer hitch which is releasable from the tractor, so that the trailer can be disconnected from the tractor without requiring dismounting from the tractor by the operator.

In its broadest aspect, the invention relates to a connection or a hitch for a pair of vehicles which are to be brought together; and provides for means to avoid the necessity of exact alignment of the vehicles to be connected as they are being joined.

Briefly, in accordance with the present invention, the self-coupling tractor-trailer hitch is designed to be used with a pair of laterally extending connecting pins secured to one of the vehicles. The other vehicle has the hitch associated therewith. It consists of a pair of bearings which are open at the top, and spaced from each other by a spacer bar by about the distance of the laterally extending pins. The bearings are so arranged that the pins can be dropped into the bearings. In order to provide for initial misalignment of the two vehicles, the bearings or a housing associated therewith, are formed with guide surfaces which are inclined towards the openings in the bearings, so as to guide the pins into the bearings for correct seating therein. Means are provided to latch the pins into the bearings, which latching means are manually disengageable from the tractor, so that under normal operation the pins cannot escape from the bearings as the tractor pulls the trailer; yet, upon operation of the latching means from the tractor, the bearings can be dropped out from under the pins and the two vehicles disconnected.

The present invention is applicable to tractors having a pair of lower connecting arms together with an upper connection arm, a so-called three point or triangle hitch; or to a connection arrangement in which four arms are provided, two lower ones and two upper ones.

The structure, organization and operation of the invention will now be described more specifically in the following detailed description with reference to the accompanying drawings, in which:

FIG. 1 is a side view of the hitch according to the present invention;

FIG. 2 is a plan view, showing the outline of the tractor in dot-dashed lines;

FIG. 3 is a side view, in section, of the coupling element;

FIG. 4 is a side view of the element of FIG. 3;

FIG. 5 is a plan view of the coupling element of FIG. 3;

FIG. 6 is a front view of the coupling element of FIG. 3;

FIG. 7 is a sectional view of a modification of an embodiment of the present invention, to a different scale from FIG. 3;

FIG. 8 is a plan view of the hitch of FIG. 7; and

FIG. 9 is a sectional view along line A, B of FIG. 7.

The tractor-trailer hitch is illustrated in connection with an agricultural tractor having a three point or triangular hydraulic suspension apparatus. Referring now particularly to FIGS. 1 and 2, the tractor S shown in outline only, provides a support for a pair of pivotally attached lower traction arms 1, 2, and an upper, central traction arm 3. The three arms are hydraulically adjustable in their relative vertical position. The length of the upper traction arm 3 is adjustable, for example by means of a threaded bushing 4, as is well known in the art.

The releasable self-coupling hitch itself is formed of a pair of bearings 6 (FIG. 2) spaced from each other by means of a spacer bar 5. Coupling pins A, associated with the trailer shown only in outline form, G, are secured to the trailer in predetermined positions and bearings 6 as well as a coupling unit attached to arm 3 and upwardly spaced from the bar 5 are arranged to be engaged with said pins A.

Bearings 6 are formed to be open on the top, for example by being formed as semi-circular bushings welded into a housing 8 to form a bearing assembly therewith. Housing 8 itself is secured to the spacer bar 5 which may be arranged to be adjustable in its length, for example by being formed of a pair of telescoping rods, and held in proper length by placing a bolt through matching holes. The adjustment feature of bar 5 itself is not shown for clarity in the drawing and will be obvious to those skilled in the art. Above the open surface of bearings 6 guide surfaces 9, 9a, are provided, forming inclined planes and directing the pins A of the trailer into the bearing openings. As shown more clearly in FIGS. 2 and 5 the guide surfaces are at right angles to each other. Referring to FIG. 2, guide surfaces 9 are directed toward each other and initial misalignment of the trailer with respect to the tractor will cause pins A to slide along the guide surfaces and thus realign the trailer or tractor and provide for positive seating of the pins A within bearings 6. Connection of the tractor to the trailer can easiest be done by backing the tractor S against the trailer G.

Housings 8 of bearings 6 are secured to the traction arms 1, 2, by a connecting bolt 10, passing through an opening within the traction arm (see FIGS. 4 and 6). The ends of the traction arms are preferably provided with a bearing 11 (FIG. 6). Bolt 10 may be secured against accidental removal by means not shown, for example a cotter pin. The bearing 6 is seated within a hook shaped portion 12 of the housing 8 (FIGS. 1, 3) against which the pull of the trailer is exerted. To prevent accidental removal of the pins A from their seat in the bearing 6, a latch member 14 is provided, having a projecting lug 14a with a camming surface formed on the upper side thereof (FIG. 3). A pin A sliding downward along guide surface 9a (FIG. 5) will hit the upper camming surface of lug 14a causing it to tilt from the solid position (FIG. 3) to the position shown in dashed form, and permitting seating of pin A within bearing 6. As soon as the pin A is seated in bearing 6, lug 14a, secured to its latching member 14 will return to the position shown in solid lines (FIG. 3) due to action of the spring 17, and the pin A, and thus the vehicle attached thereto, will be secured against accidental removal. The latch member 14 pivots about a pin 15. In order to manually unlatch the trailer from the tractor, a rod 16 (FIGS. 1, 3, 4) is coupled to the latch member 14. Upon lifting up of rod 16 latch 14 will again move to the position shown in dotted lines (FIG. 3) and upon dropping of the lower traction arms 1, 2, the trailer may be removed from the tractor. The bearing housing 8 is further formed with a bottom plate 13, which limits the pivoting movement of the bearing 5 and its housing about bolt 10 in traction arms 1.

Some trailer apparatus G, not shown, may have projecting portions. In order to prevent interference of the spacer bar 5 with such projecting portions, bar 5 may be secured to the housing 8 not by a fixed connection, such as welding, but rather by a bolt and pin connection so that its vertical position, as well as its horizontal position can be adjusted. Such adjustment may also avoid interference with a centrally arranged pintle hook, or ball and socket trailer hitch with which some tractors are supplied.

The upper central connection of the hydraulic attachment arrangement of the tractor S includes a gripper 7, secured to arm 3 to swing about an axis 18 (FIG. 1). For some installations a universal joint is preferred. Similar to the latching arrangement of the bearings 6 within housing 8, a latch may be arranged for hook 7 which in the embodiment shown in FIG. 1 is formed by handle 21 swingable about an axis 22. Handle 21 is formed in such a way that it can readily be reached by the operator of the tractor S, from the seat thereof. If desired, it can be coupled with release rod 16 for the lower traction arm connection.

The self-coupling tractor-trailer hitch does not require any modifications of known equipment, either on part of the trailer, or on part of the tractor. For coupling of the tractor it is only necessary to adjust the spacer bar to the proper length to engage with pins A already provided on the trailer, and then secure the assembly of the pair of bearings 6 within housing 8, and the spacer bar 5, to the traction arms 1, 2, already provided on the tractor S by means of bolts 10. These bolts can then be secured by cotter pins. The upper hydraulic traction arm is provided with the gripper assembly 7. As the tractor S is then backed up toward the trailer G, and the hydraulic arms are raised for proper height with respect to the pins A as provided on the tractor G, pins A slip over lugs 14a, as well as the projection on handle 21, to catch in their appropriate bearings. Misalignments of the relative position of tractor and trailer are compensated by the inclined surfaces 9, 9a. Lugs 14a and the lug on handle 21 then prevent accidental removal of the pins A from their proper seating. The whole operation requires only the driver of the tractor, and a second person to properly align, or assemble the tractor to the trailer is not necessary; neither is it necessary for the driver of the tractor to dismount and physically connect tractor and trailer after having brought them into exact alignment.

To disconnect the tractor from the trailer handle 21 is first operated to release the top pin A from the top hydraulic arm 3. Simultaneously or subsequently, pull rods 16 are operated to unlatch lug 14a, and traction arms 1 and 2 are lowered to permit release of the lower pins A from their seat within bearing 6.

The arrangement described in connection with FIGS. 3 to 6 is such that the pins A are approximately aligned with bearings 11 of traction arms 1, 2. The thickness of bearings 6 adds to the distance between which the traction arms 1 and 2 must be spread to engage pins A of trailer G. Spreading the traction arms 1 and 2 may, however, interfere with the freedom of the trailer to follow turns of the tractor, or cause difficulties in controlling the position of the trailer with respect to the tractor, if the trailer is to be an agricultural implement such as a plow. By laterally swinging the traction arms this position of the trailed implement is adjustable; this, however, demands not only that bearings 11 are movable with respect to traction arms 1, 2, but also that the traction arms are as parallel as possible.

FIGS. 7 to 9 illustrate a modification of the present invention in which the width of the bearings does not add to the angle of spread between the traction arms 1, 2. In accordance with this modification, see particularly FIG. 7, the bearings 6 in their housings 8 are mounted above the traction arms 1 or 2. Thus, the angle of spread between the arms is not increased. The holding or connecting bolts 10, passing through the bearings 11 of the traction arm are arranged at the lower part of the housing 8, see FIG. 7. Similar to the embodiment shown in FIGS. 3 to 6, the holding bolt is again passed through bearings 11 in the traction arm 1, through the housing 8, and secured for example, by means of a spline, or a cotter pin. The spacer bar 5 similar to the embodiment shown in FIGS. 1 to 6 is utilized as before, secured for example, by means of a bolt 38 passed through housing 8. In order to provide for some relative motion between the housings 8 secured to their respective traction arms 1, 2, bolt 38 is spaced somewhat from its matching hole in housing 8, and the space is filled in with a compressible, resilient material, such as rubber. Since the spacer bar 5 does not have to transmit any forces, but serves merely to maintain the proper distance of the two housings 8 so that the pins A can pass into the bearings 6 during coupling, no unusual wear or deterioration of such a rubber insert or rubber bushing will be experienced. FIG. 7 illustrates a different embodiment of the latching device for bearing 6. Again, as in the embodiment illustrated in FIG. 3, a latching member 14 having a projecting lug 14a and rotatable about a pin 15, is provided. To couple a trailer to the tractor the operating rod 16 is pulled up, moving with it a locking pin having a pair of locking surfaces. The weight of the upper portion of member 14 causes the member to fall back, and freeing the opening of bearing 6. As pin A of the trailer drops into bearing 6 it will engage the lower portion of the circular camming surface of lug 14a, causing lug 14a to swing forward and downward into the position shown in solid lines in FIG. 7, securing pin A against removal. At the same time the locking pin attached to the operating member 16 will be free to slip down into the solid line position shown in FIG. 7 and prevent further rotation of locking member 14 and lug 14a. To uncouple, the operating rod 16 is pulled up, thus freeing latch member 14 and its projecting lug 14a and permitting rotation of the latch member 14 and thus removal of pin A from the seat in bearings 6.

In order to provide for a movable attachment of housing 8 to the traction bars 1, 2, housing 8 is secured to the traction bars by means of a ball joint assembly, permitting swinging movement about a plane perpendicular to that of the paper, FIG. 7. The upper portion of housing 8 is secured to the circumference of a ball unit 30, the axis of which is connected by means of a pin 36 with a pair of links 35 (FIG. 8) which in turn are connected to the pin 37 of a second ball unit 31. The ball joint 31 is connected to the traction rod 1 simply by a support plate 32, clamped to traction rod 1 by means of a back-up plate 33 and screws 34 (FIG. 9). The coupling is easily secured to the traction bars 1, 2, by placing the support plate 32 of the ball joint 31 on the traction rod, passing screws 34 downwardly alongside the traction rod and securing the screws. Thereupon, housing 8 of bearing 6 is poined by means of bolt 10 through bearings 11, and secured, for example by means of a cotter pin. Connecting links 35 by means of pins 36, 37, completes the assembly. After securing the other bearing to the other traction rod, the spacer bar 5 is mounted on bolts 38, with the rubber bushing between the bolt 38 and the housing 8, as previously referred to.

The embodiment according to FIGS. 7 to 9 has the advantage that it can readily and quickly be mounted on the traction bars. The ball joint 31, with its support plate 32 back-up plate 33, and screw 34, may remain on the traction bars and the coupling can be used, or not, merely by removal of bolts 10 and 37. Since the bearings are mounted above the traction rods 1, 2, the angle of spread therebetween is reduced, and the freedom of relative movement of the bearings 6 with respect to the traction rod, as well as with respect to each other, is improved.

It is of course possible to provide a spacer bar 5 between the traction arms 1, 2, themselves if trailers having the same distance between their attachment pins A are to be used.

The present invention has been illustrated in connection with a removable hitch for tractors, and particularly agricultural tractors, intended as an adaptation of already existing equipment. Of course, it is equally possible to provide a hitch according to the present invention as original equipment, or permanently mounted on the traction arms. Thus, for example ball joint 31 (FIGS. 8, 9) may be secured to traction arm by welding, by rivets or by screw connection with matching holes in the traction arms. Likewise, bolts 10 and bearings 11 may be designed for permanent attachment.

The invention has been illustrated and described as embodied in a trailer hitch or agricultural tractors and trailers. It is not intended to be limited to the detailed showing, however, since various modifications and structural changes may be made. By applying current knowledge the invention may be adapted to various applications. Such adaptations should and are intended to be comprehended within the inventive concept.

We claim:

1. A hitch arrangement for connecting a tractor to a trailer having a pair of spaced laterally extending connecting pins, comprising:
    (a) a pair of traction arms adapted to be attached to said tractor;
    (b) two housings;
    (c) a pair of ball points for interconnecting each traction arm to an associated one of said housings in a position in which the housing is secured to the traction arm above the upper surface thereof;
    (d) means securing said one housing to one of said ball joints for limited movement about a first axis;
    (e) means securing said traction arm to the other ball joint for limited movement about a second axis;
    (f) link means interconnecting said ball joints and movable with respect to said ball joints about a third axis, said ball joints and said link means being free to move into a position in which said three axes are non-parallel with respect to each other,
    (g) a bearing in each of said housings and adapted to receive an associated connecting pin of the trailer, the bearing being formed with a vertical opening to permit dropping said pin into said bearing,
        (1) said housing having a pair of relatively angled guide surfaces inclined toward said opening; and
    (h) a spacer bar, said bearings being secured to opposite ends of said spacer bar.

2. A hitch arrangement for connecting a tractor to a trailer having a pair of laterally spaced lower connecting pins and an upper connecting pin vertically spaced from said lower pins comprising:
    (a) a support;
    (b) two lower traction arms attached to said support for movement in respective vertically extending planes and for lateral movement toward and away from each other;
    (c) an upper traction arm pivotally attached to said support and upwardly spaced from said lower traction arms;
    (d) a pair of bearing assemblies,
        (1) each bearing assembly being formed with an upward opening to permit dropping of said lower connecting pins into said bearing assemblies, and having a pair of relatively angled guide surfaces inclined toward said opening;
    (e) securing means securing said bearing assemblies to said lower traction arms respectively;
    (f) a spacer bar having two opposite ends respectively secured to said bearing assemblies for connecting said lower traction arms,
        (1) said spacer bar being downwardly spaced from said upper traction arm; and
    (g) means on said upper traction arm manually operable for connecting said upper traction arm with said upper connecting pin.

3. An arrangement as set forth in claim 2, wherein said bearing assemblies and said spacer bar are movably connected.

4. An arrangement as set forth in claim 2, wherein said spacer bar is of adjustable length.

5. An arrangement as set forth in claim 1, further including latch means associated with each bearing assembly for removably locking a pin in the bearing assembly, said latch means including a lug member secured to said assembly for movement toward and away from a locking position in which the lug member obstructs the opening of said assembly, said lub member having a camming surface and responding to downward pressure on said surface by a connecting pin to move away from said position, and manual means for said lug member away from said position thereof.

6. An arrangement as set forth in claim 1, wherein said assembly includes a housing member having said guide surfaces, and a bearing member received in said housing member and formed with said opening therein.

References Cited

UNITED STATES PATENTS

| | | | |
|---|---|---|---|
| 2,951,711 | 9/1960 | Karnath et al. | 280—508 |
| 2,952,323 | 9/1960 | Orelind et al. | 280—461 X |
| 2,972,424 | 2/1961 | Cadwell | 172—272 X |
| 3,090,639 | 5/1963 | Virtue et al. | 280—479 X |
| 3,116,075 | 12/1963 | Hershman et al. | 280—479 |
| 3,172,686 | 3/1965 | Beard | 280—461 |
| 3,195,651 | 7/1965 | Todd | 280—461 X |

OTHER REFERENCES

Walter Huneke: German DAS No. 1,134,235 published Aug. 2, 1962.

LEO FRIAGLIA, *Primary Examiner.*